United States Patent Office 3,162,609
Patented Dec. 22, 1964

3,162,609
SELF-EXTINGUISHING URETHANE POLYMER
COMPOSITIONS
Jacob Eichhorn, Midland, Mich., assignor to The Dow
Chemical Company, Midland, Mich., a corporation of
Delaware
No Drawing. Filed May 31, 1960, Ser. No. 32,619
23 Claims. (Cl. 260—2.5)

This invention relates to urethane polymer compositions. More particularly, it relates to self-extinguishing polyurethane compositions and cellular structures made from such compositions. This invention also pertains to compositions suitable for rendering materials self-extinguishing.

Polyurethanes are polymers containing repeated

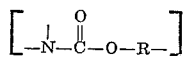

urethane linkages. These polymers are made by reacting a polyisocyanate with a compound having a plurality of active hydrogens. By compound having active hydrogen is meant a compound that gives a positive Zerewitinoff test. Polyurethane resins can be made into foams having excellent strength, durability, low density, light color, uniform cell size and good heat insulating properties, and can be used for many purposes. Unfortunately, these foams burn readily when ignited, that is, they support combustion thus making them unsuitable for certain uses in which fire is a hazard. Accordingly, it is desirable to make polyurethane resin foams which are self-extinguishing so as to eliminate or minimize the hazard of fire. By "self-extinguishing" it is meant that the material is incapable of burning or sustaining a flame for more than a short time after it is separated from an open flame in which it has been heated and ignited. In other words, a composition is considered to be self-extinguishing if it stops burning shortly after a flame used to start its burning has been removed or the material is taken out of the flame.

Certain organic bromine compounds particularly organic bromine compounds containing two or more bromine atoms attached to carbon atoms of an aliphatic or cycloaliphatic radical, for example, tris(2,3-dibromopropyl)phosphate and 1,2,3,4-tetrabromobutane, have a tendency to render foams with which they are admixed self-extinguishing by reducing the time that such foams continue to burn after having been separated from a flame causing their ignition. However, these organic bromides produce disadvantageous effects in foams in which they are incorporated, such as impairment of tensile strength, original appearance, light stability, and other properties of the foams, when used as the sole agent and in sufficient quantity to render foams self-extinguishing. In addition, these bromine compounds increase the cost of foams made with them when the bromine compounds are used in such amounts as to cause an appreciable improvement in the self-extinguishing properties of the foams.

It is among the objects of the present invention to provide urethane polymer compositions having improved self-extinguishing properties.

A further object of the present invention is to provide self-extinguishing polyurethane resin foam compositions.

A still further object of this invention is the provision of self-extinguishing polyurethane foams of good strength and appearance in an economical and convenient manner.

Still another object of this invention is the provision of a composition of matter useful for rendering materials self-extinguishing, and particularly such a composition made up entirely of inorganic materials.

These and other objects are accomplished in accordance with the following detailed description of this invention.

It has now been discovered that combinations of ammonium bromide with certain inorganic compounds act synergistically to render urethane polymers self-extinguishing when admixed therewith.

In accordance with the invention it has been found that self-extinguishing urethane polymers are provided when both certain inorganic compounds and ammonium bromide are present in an intimate mixture in urethane polymer material. The synergistic effect of the inorganic compounds and the ammonium bromide in combination, uniformly dispersed throughout the polymeric material is such that a given total amount of a combination of these synergists imparts substantially greater self-extinguishing properties to urethane polymers than does the same amount of either of these materials used alone. In situations in which a quantity of one of the materials used alone produces some self-extinguishing effect on urethane polymers, a lesser quantity of the new combination of ammonium bromide with an inorganic compound as herein disclosed will produce the same or an improved effect.

In accordance with the invention, the inorganic compounds that act synergistically with ammonium bromide are antimonous oxide, arsenous oxide, arsenic oxide, phosphoric oxide, antimonous chloride, antimonous bromide, antimonous iodide, and antimony oxychloride.

As indicated above, polyurethane resins can be made by reacting a polyisocyanate with a compound having a plurality of active hydrogens. Representative examples of polyisocyanates that can be used to make the resin are 2,4-tolylene diisocyanate, 2,6-tolylene diisocyanate, the phenylene diisocyanates, the naphthalene diisocyanates, 1,2,4-benzene triisocyanate, hexamethylene diisocyanate, trimethylene diisocyanate, ethylene diisocyanate,1,4-cyclohexylene diisocyanate, 1,3-cyclopentylene diisocyanate and mixtures thereof. Arylene diisocyanates, that is, those in which each of the two isocyanate groups is attached directly to an aromatic ring, are preferred. The compound mentioned above having a plurality of active hydrogens can be a polyhydroxy compound such as glycols, triols, hexols, octols, polyesterpolyols and polyetherpolyols. A polyesterpolyol can be made by reacting a polybasic acid with an excess of a polyhydric alcohol. If a linear polyesterpolyol is desired, difunctional reactants can conveniently be used, such as phthalic acid or its anhydride with ethylene glycol. A polyetherpolyol can be made by condensing a polyhydroxy compound such as ethylene glycol, glycerol and sucrose with an alkylene oxide such as ethylene oxide, propylene oxide, and 1,2-butylene oxide. Using a mixture of polypropylene oxide-glycerol adducts of the formula:

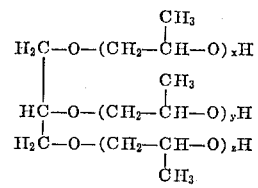

rigid polymer when the sum of x, y, and z is
a flexible polymer when the sum of x, y, and
; or higher. Relatively low molecular weight
le sucrose condensates produce rigid polymers
erized with polyisocyanates. Polymers of
lity and flexibility can be tailored by selecting
e or a mixture of condensates of suitable
eight and structure to be reacted with the
te. Other hydroxyl-rich compounds such as
of ethylene-diamine with propylene oxide can
oduce useful polyurethanes. By still another
roach, polyurethanes can be made by react-
roformate with a polyamine. In all instances
polymers contain multiple urethane linkages.
ane resins can be made in cellular form by
r or a carboxyl group-containing compound
a mixture containing polyisocyanates, where-
oxide is liberated which causes the liquid re-
re to expand and foam. Alternatively, a
foam may be made by admixing a volatile
one of the reactants, namely, the polyisocya-
compound containing a plurality of active
efore they are mixed. The volatile liquid
ctants can all be brought together simul-
the volatile liquid can be mixed with the re-
tly after they are brought together. The
1 is converted to a gas when the reactants are
e to the heat of the reaction or by external
by producing small gas bubbles in the react-
Representative examples of suitable volatile
can be used for this purpose are trichloro-
ethane, hexane, methyl-chlorform, sym-
chlorodifluoroethane, and trichlorotrifluorofor the reaction between the isocyanate radi-
e hydrogen can be used when making ure-
ers and is usually desirable when a product
rm is to be made. Representative examples
catalysts are, triethylenediamine, dibutyltin
iethylamine, N,N-dimethylcyclohexylamine,
enate and stannous octoate.
a cell size control agent can be added to the
ure. Materials such as copolymers of poly-
ol and dimethylsiloxane serve to produce
ler size in polyurethane foams. These ma-
e made as described in British Patent No.
presentative examples of other cell size con-
re sodium dioctyl sulfosuccinate and zinc nium bromide and the inorganic compound
porated in the resin by any method which
a distribution of the agents throughout the
resin and which does not cause or result in
leterioration or decomposition of either of
the resin.
nium bromide and the inorganic compound
ed and then added to the isocyanate material
ve hydrogen containing material before the
are brought together to form the polymer.
the synergists of this invention can be pre-
en blended with the polymer forming react-
are brought together or shortly after they
and before the reaction has proceeded to a
uniform dispersion of the synergists in the
longer practicable. If desired, the syner-
of this invention may be added one at a time
er forming constituents. To illustrate, one
can be added to the isocyanate material, to
trogen containing material, to a mixture of
ls as they are brought together or shortly
before the reaction of the polymer forming
as proceeded to a point where uniform dis-
additive in the polymer is no longer prac-
two or more of these places. The other agent can be added at one or more of the above places
which may be the same or different from where the first
agent is added.

The formulations of this invention can be made by
batch methods employing either hand mixing or simple
stirring equipment. Several types of mechanical equip-
ment are available which can automatically meter the
constituents to a mixer and dispense foams in predeter-
mined quantities. This equipment can be run either con-
tinuously or intermittently.

Self-extinguishing polymer compositions of this inven-
tion can be made into useful articles by conventional mold-
ing, casting, coating and laminating techniques. Foams
of these compositions can be cast onto a conveyor belt to
produce sheets or slabs of self-extinguishing polyurethane
foams which may then be cut up into convenient sizes.
The self-extinguishing foams made from the compositions
of this invention can be cast in molds to make desired
shapes or the foams can be cast in place to fill voids in
a final article as in the potting of electrical equipment and
the strengthening of double walled members.

The following examples, in which the parts are parts
by weight, are illustrative of the present invention but are
not to be construed as limiting its scope.

EXAMPLE I

There are dissolved in 33.6 parts of a polyol [having
a hydroxyl content of about 17.3 percent (determined by
acetylation) and a viscosity of 200 stokes at 24° C.
formed by reacting a mixture of equal parts of glycerine
and sucrose with propylene oxide] ¼ part of triethylene-
diamine and ¼ part of dibutyltin dilaurate. Into this
solution there is then admixed ¼ part of a copolymer of
polyethylene glycol and dimethylsiloxane, the copolymer
having an average molecular weight of 2,500 and made
as described in British Patent No. 793,501. The mixture
is stirred and cooled to 50° F. To this cooled mixture is
then added with stirring 12.4 parts of trichlorofluoro-
methane as a blowing agent. The above composition is
rapidly admixed in a container with 53.25 parts of an
adduct of a polyol and an excess of a mixture of tolylene
diisocyanates, there being 80 percent of the 2,4-isomer and
20 percent of the 2,6-isomer in the diisocyanate mixture.
The polyol has an average molecular weight of 4000 and
is made by condensing propylene oxide with glycerine.
The excess of the tolylene diisocyanate is such that the
—NCO content of the adduct is about 30 percent. The
polyol-tolylene diisocyanate adduct has a viscosity of 105
stokes at 24° C. Based on the weight of the above total
mixture there is then added 10 parts per hundred of
ammonium bromide and 5 parts per hundred of antimo-
nous oxide. Stirring is again employed to assure uniform
distribution of all constituents. The mass begins to foam
and is discharged into a mold. When the foam has
gelled it is placed in a curing oven at 70° C. After 15
minutes the foam is removed from the oven and allowed
to cool to room temperature. The cellular mass is a
white, rigid, fine-celled foam.

A test strip is cut from the foam product and tested for
flammability. The strip is in the shape of a rectangular
prism three inches long, ¾ inch wide, and 3/16 inch thick.
The strip is placed in the flame of a microburner and
after approximately four seconds, it is removed. Upon
removal from the microburner flame, the strip is itself
aflame, and continues to burn for 1 second from the time
it is removed from the microburner flame. After the 1
second has elapsed, the flame on the foamed polymer
strip goes out, that is, the material no longer sustains a
flame, and is said to have a self-extinguishing time of 1
second.

By contrast, foam strips are made and tested in the
manner described in Example 1 using the same con-
stituents and procedure but omitting either the antimo-
nous oxide or the ammonium bromide and varying the amount of these agents used. The results of the tests are shown in Table I.

Table I

| Regent | Amount Added (p.p.h.)[3] | S.E.[1] Time (seconds) |
| --- | --- | --- |
| Antimonous oxide | 20 | [2] B |
| Ammonium bromide | 15 | B |

[1] S.E.=self-extinguishing.
[2] B=burns completely.
[3] P.p.h.=parts per hundred.

EXAMPLES II THROUGH VI

Foam strips are made and tested as in Example I except that 5 parts per hundred, in finely divided form, of one of each of the materials listed in the table below is substituted for the antimonous oxide used in Example I to act synergistically with the $NH_4Br$. The results obtained appear in Table II.

Table II

| Example No. | Reagent (5 p.p.h.) | S.E. Time (seconds) |
| --- | --- | --- |
| II | $As_2O_3$ | 1 |
| III | $As_2O_5$ | 8 |
| IV | $P_2O_5$ | 2½ |
| V | $SbCl_3$ | 1 |
| VI | $SbOCl$ | 1 |

In a manner similar to the foregoing Example V, 5 parts per hundred of $SbBr_3$ and 5 parts per hundred of $SbI_3$ are separately substituted for the 5 parts per hundred of $SbCl_3$ used in Example V, to act synergistically with the ammonium bromide. Results similar to that obtained in Example V are achieved.

In the practice of the present invention the ammonium bromide is employed in amounts corresponding to from 5 to 15 percent, preferably from 7 to 12 percent, together with the inorganic compound in amounts of from 2 to 12 percent, preferably from 3 to 8 percent. The percentages are based on the weight of the polymer, including the blowing agent when a blowing agent is used. Self-extinguishing urethane polymer compositions are obtained by employing both the ammonium bromide and the inorganic compounds in proportions within these ranges.

It is found that mixtures of ammonium bromide with the inorganic compounds above described are stable. These synergistic combinations can be premixed and then used to render the products self-extinguishing.

When using the synergistic agents of this invention in premixed form, the premixture preferably contains from 7 to 12 parts by weight of ammonium bromide and from 3 to 8 parts by weight of the synergistic inorganic compound. A composition containing about 10 parts by weight of ammonium bromide and about 5 parts by weight of the synergistic inorganic compound is found especially suitable for purposes of this invention.

In using the mixtures of this invention one or more of the inorganic compounds herein disclosed can be used in combination with the ammonium bromide. When smaller amounts of the synergistic mixtures are used than indicated in the examples the self-extinguishing time is greater than indicated in the examples; when greater amounts are used the time becomes less. While greater amounts of the synergistic mixtures than necessary to produce self-extinguishing times of less than one second can be used without harmful effect, the use of such amounts is presently considered uneconomic. It will be understood, that in the practice of the invention, various other additives may be incorporated in the polymer along with the presently disclosed synergists, such as fillers, pigments, dyes, plasticizers, and stabilizers.

That which is claimed is:

1. A composition of matter comprising a polyurethane resin containing intimately admixed therewith from 5 to 15 percent based on the weight of the resin of ammonium bromide and from 2 to 12 percent based on the weight of the resin of an inorganic compound selected from the group consisting of $Sb_2O_3$, $As_2O_3$, $As_2O_5$, $P_2O_5$, $SbCl_3$, $SbBr_3$, $SbI_3$, $SbOCl$, and mixtures thereof.
2. A composition according to claim 1 in which the inorganic compound is $Sb_2O_3$.
3. A composition according to claim 1 in which the inorganic compound is $As_2O_3$.
4. A composition according to claim 1 in which the inorganic compound is $P_2O_5$.
5. A composition according to claim 1 in which the inorganic compound is $SbCl_3$.
6. A composition according to claim 1 in which the inorganic compound is $SbOCl$.
7. A self-extinguishing foam comprising a normally flammable polyurethane resin in intimate admixture with from 2 to 12 percent based on the weight of the resin of an inorganic compound selected from the group consisting of $Sb_2O_3$, $As_2O_3$, $As_2O_5$, $P_2O_5$, $SbCl_3$, $SbBr_3$, $SbI_3$, $SbOCl$, and mixtures thereof, and from 5 to 15 percent based on the weight of the resin of ammonium bromide.
8. A self-extinguishing foam according to claim 7 in which the inorganic compound is $SbOCl$.
9. A self-extinguishing foam according to claim 7 in which the inorganic compound is $Sb_2O_3$.
10. A self-extinguishing foam according to claim 7 in which the inorganic compound is $As_2O_3$.
11. A self-extinguishing foam according to claim 7 in which the inorganic compound is $P_2O_5$.
12. A self-extinguishing foam according to claim 7 in which the inorganic compound is $SbCl_3$.
13. A self-extinguishing rigid resin foam comprising a normally flammable polyurethane resin and, uniformly distributed throughout the resin and based on the weight of the polyurethane resin and entrapped gas, from 7 percent to 12 percent of ammonium bromide and from 3 percent to 8 percent of an inorganic compound selected from the group consisting of $Sb_2O_3$, $As_2O_3$, $As_2O_5$, $P_2O_5$, $SbCl_3$, $SbBr_3$, $SbI_3$, $SbOCl$, and mixtures thereof.
14. A self-extinguishing rigid cellular material comprising by weight, 100 parts of a polyurethane resin, about 10 parts of ammonium bromide and about 5 parts of an inorganic compound selected from the group consisting of $Sb_2O_3$, $As_2O_3$, $As_2O_5$, $P_2O_5$ $SbCl_3$, $SbBr_3$, $SbI_3$, $SbOCl$, and mixtures thereof.
15. A composition of matter for rendering normally flammable materials self-extinguishing when intimately incorporated therein comprising from 7 to 12 parts by weight of ammonium bromide and from 3 to 8 parts by weight of an inorganic compound selected from the group consisting of $Sb_2O_3$, $As_2O_3$, $As_2O_5$, $P_2O_5$, $SbCl_3$, $SbBr_3$, $SbI_3$, $SbOCl$ and mixtures thereof.
16. A composition for rendering normally flammable materials self-extinguishing when intimately incorporated therein comprising about 10 parts by weight of ammonium bromide and about 5 parts by weight of an inorganic compound selected from the group consisting of $Sb_2O_3$, $As_2O_3$, $As_2O_5$, $P_2O_5$, $SbCl_3$, $SbBr_3$, $SbI_3$, $SbOCl$, and mixtures thereof.
17. A composition of matter for rendering normally flammable materials self-extinguishing when intimately incorporated therein comprising an intimate mixture of about 10 parts by weight of ammonium bromide and about 5 parts by weight of antimonous chloride.
18. A composition of matter comprising a polyurethane resin containing intimately admixed therewith from 7 to 12 percent by weight based on the weight of the resin of ammonium bromide and from 3 to 8 percent by weight based on the weight of the resin of an inorganic compound selected from the group consisting of $Sb_2O_3$, $As_2O_3$, $_5$, SbCl$_3$, SbBr$_3$, SbI$_3$ and SbOCl, and mixtures composition according to claim 18 in which the compound is Sb$_2$O$_3$.

composition according to claim 18 in which the compound is As$_2$O$_3$.

composition according to claim 18 in which the compound is P$_2$O$_5$.

composition according to claim 18 in which the compound is SbCl$_3$.

composition according to claim 18 in which the compound is SbOCl.

References Cited in the file of this patent

UNITED STATES PATENTS 2,577,281   Simon et al. _____ Dec. 4, 1951

FOREIGN PATENTS 810,551   Great Britain _____ Mar. 18, 1959
514,329   Canada _____ July 5, 1955

OTHER REFERENCES

Merck Index, sixth edition, Merck and Company, Inc., Rahway, New Jersey (1952), page 62.